United States Patent [19]

Hennick

[11] Patent Number: 4,895,473

[45] Date of Patent: Jan. 23, 1990

[54] JOINT FOR RELEASABLY SECURING SUPPORT MEMBER IN MODULAR STRUCTURE

[76] Inventor: Donald C. Hennick, 9547 Wallingford North, Seattle, Wash. 98103

[21] Appl. No.: 87,691

[22] Filed: Aug. 20, 1987

[51] Int. Cl.$^4$ ............................................... F16B 7/08
[52] U.S. Cl. ................................... 403/191; 403/234; 403/245; 403/407.1; 248/188; 248/245
[58] Field of Search .............. 403/234, 235, 233, 191, 403/256, 261, 237, 245, 187, 407.1, 406.1, 49, 170; 248/231, 122, 188, 245, 297.2; 211/191

[56] References Cited

U.S. PATENT DOCUMENTS

| | | |
|---|---|---|
| 310,133 | 12/1984 | Haase . |
| 326,582 | 9/1985 | Osborn et al. . |
| 509,618 | 11/1893 | Goodyear . |
| 1,945,430 | 1/1934 | Garrett ........................... 403/234 X |
| 2,375,685 | 5/1945 | Pennington ...................... 403/234 X |
| 2,386,201 | 10/1945 | Ferguson . |
| 2,930,638 | 3/1960 | Morrissey ........................ 248/188 X |
| 3,167,292 | 1/1965 | Meyerowitz . |
| 3,226,897 | 1/1966 | Dorman ........................... 403/256 X |
| 3,280,767 | 10/1966 | Kahn . |
| 3,327,658 | 6/1967 | Schreyer . |
| 3,356,328 | 12/1967 | Sachau ................................ 248/245 |
| 3,572,787 | 3/1971 | Timmerman et al. . |
| 3,730,568 | 5/1973 | Giovannetti ........................ 403/245 |
| 3,964,404 | 6/1976 | Mueller et al. . |
| 4,132,178 | 1/1979 | Mueller et al. . |
| 4,237,798 | 12/1980 | Welsch et al. . |
| 4,636,104 | 1/1987 | Dinh ................................... 403/191 |

Primary Examiner—Randolph A. Reese
Assistant Examiner—Peter M. Cuomo
Attorney, Agent, or Firm—Joan H. Pauly

[57] ABSTRACT

A vertical leg (14) is received through a ring (16). An over-center latch mechanism is mounted inside a cavity (6) in a side rail (2). The end surface (2a) of the rail (2) has a recess (4). A shaft (24) has one end (26) secured to the ring (16) and extends from the ring (16) through an opening (8) in the rail (2) which communicates the recess (4) and the cavity (6). The inner end (28) of the shaft (24) is engaged by a lever (32) of the latch mechanism. Pivoting of the lever (32) pulls the ring (16) into the recess (4) and the leg (14) into contact with the end surface (2a) of the rail (2) above and below the recess (4). There is no contact between the ring (16) and any portion of the rail (2) to allow automatic adjustment for surface irregularities of the rail (2) and leg (14) and ensure firm contact between the leg (14) and rail (2). Preferably, the end (26) of the shaft (24) is pivotable relative to the ring (16). In an alternative embodiment, a latch mechanism housing (33) is mounted on the outside side surface (2b') of the rail (2') and the recess (4', 5) is formed in the rail (2') and the housing (33). In either embodiment, two rails (2, 2') may be attached to a ring (16") to form a corner joint.

10 Claims, 7 Drawing Sheets

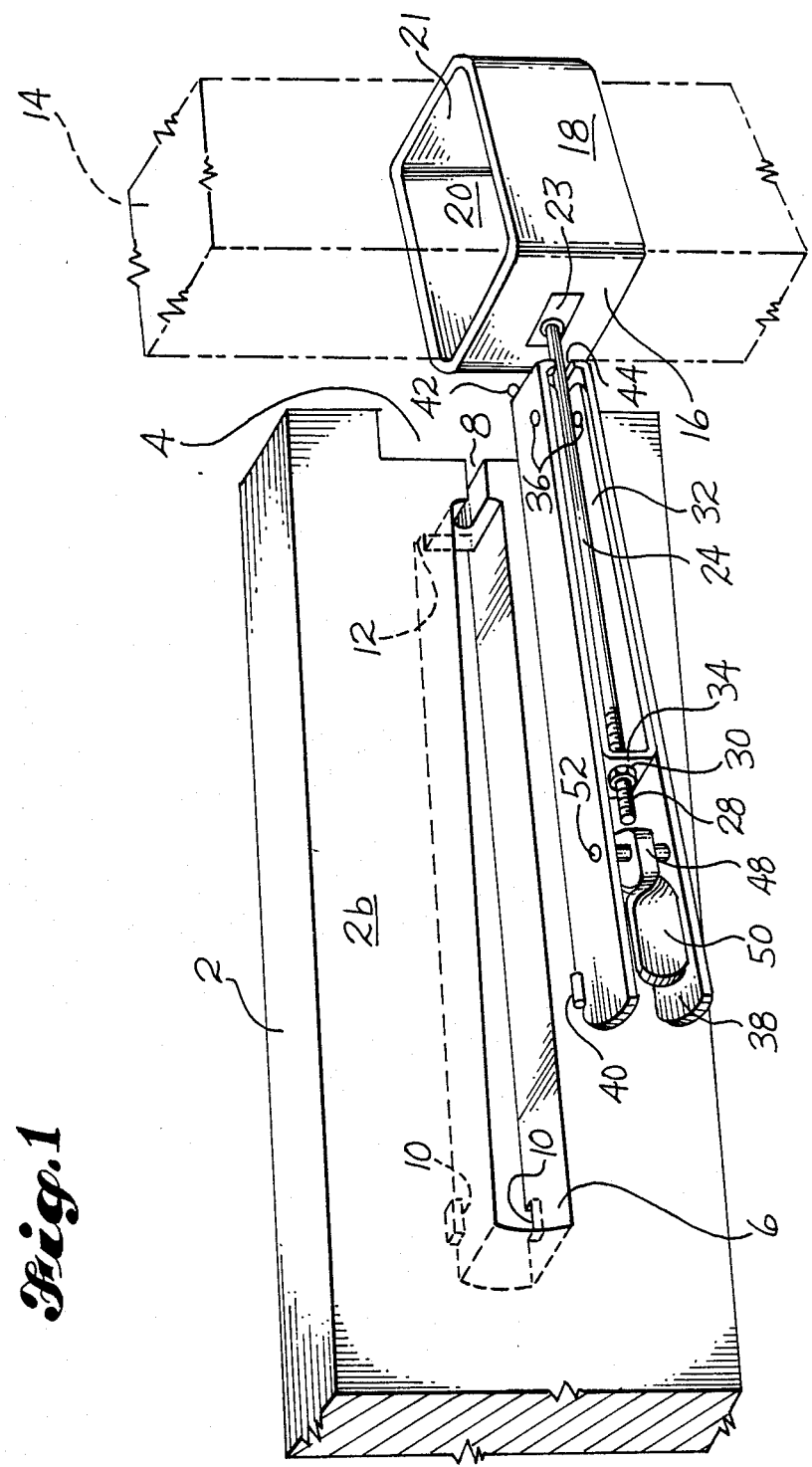

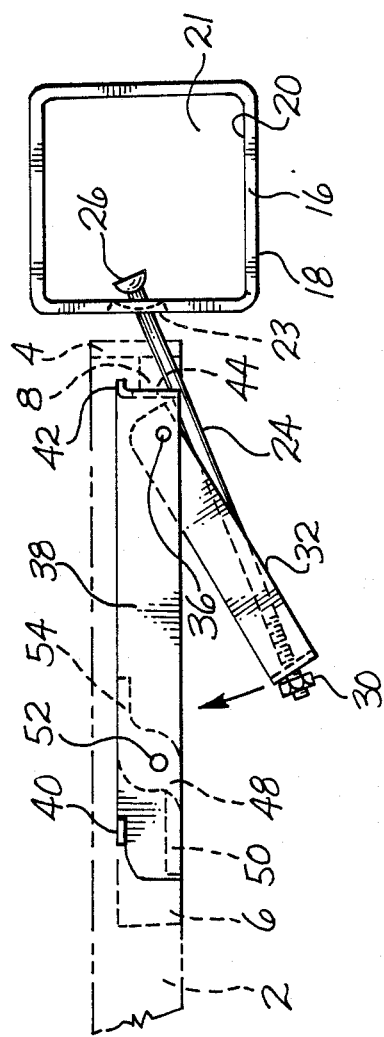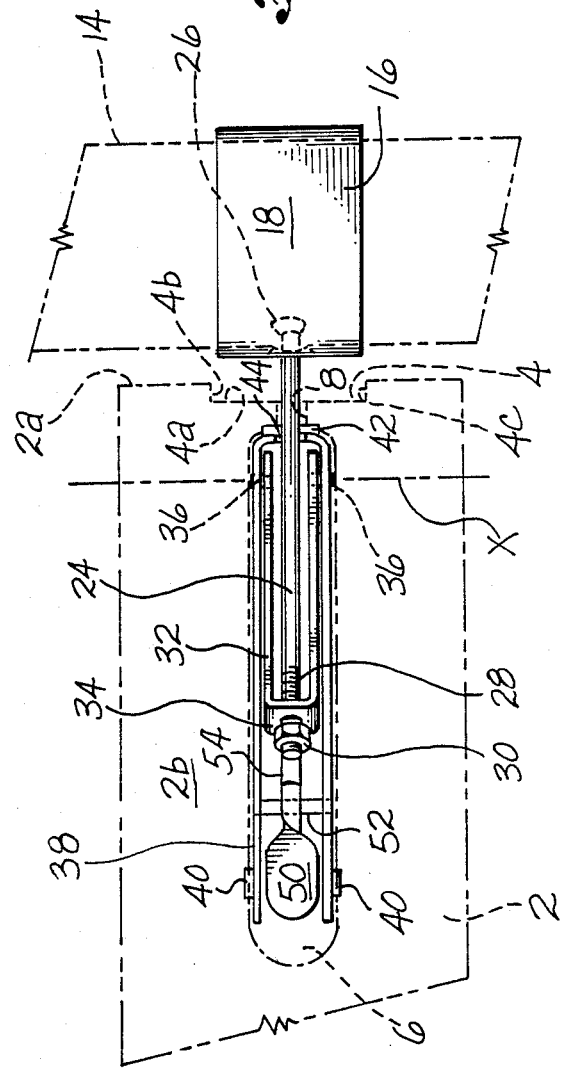

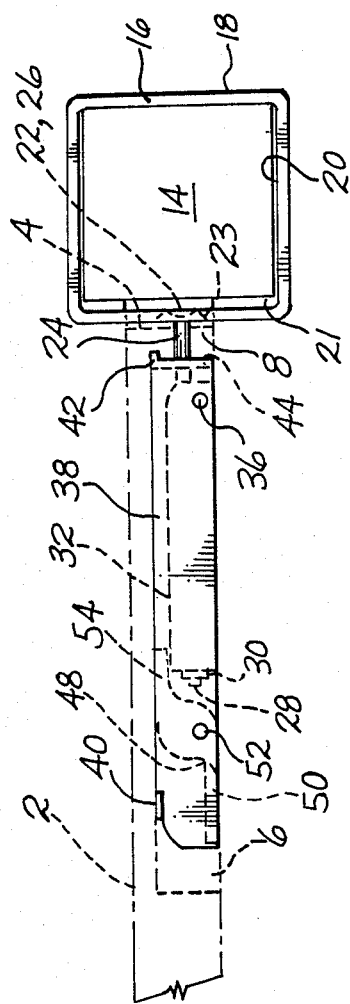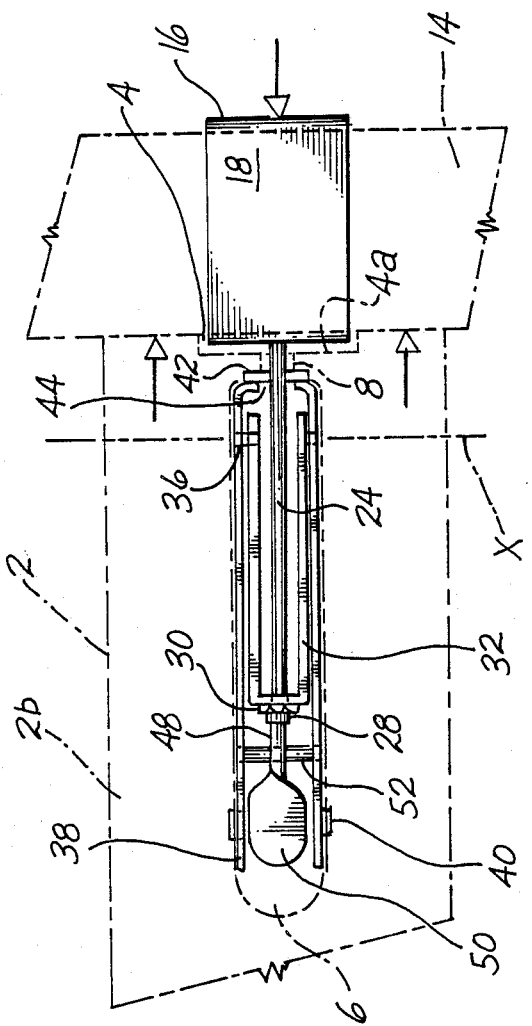

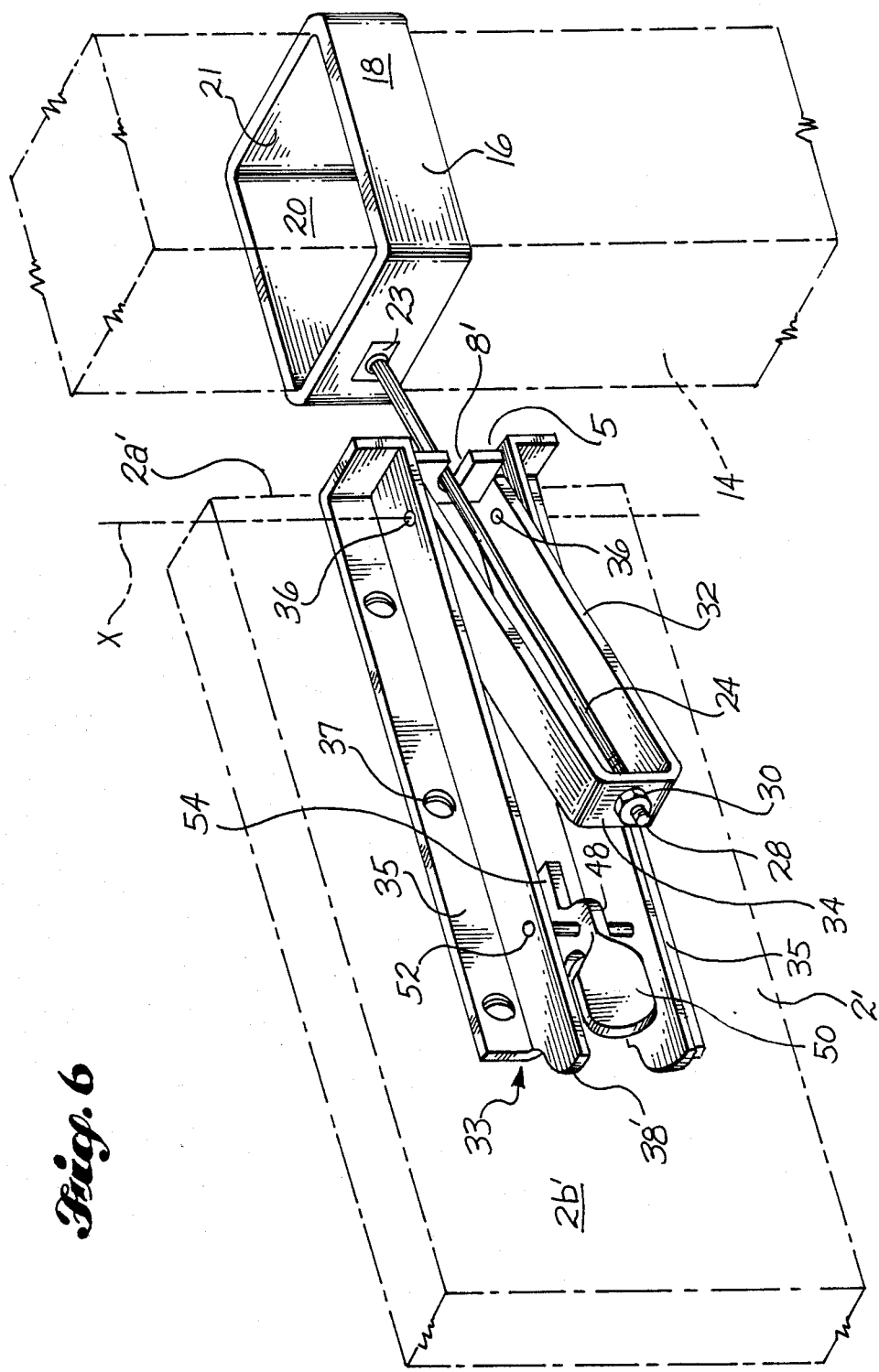

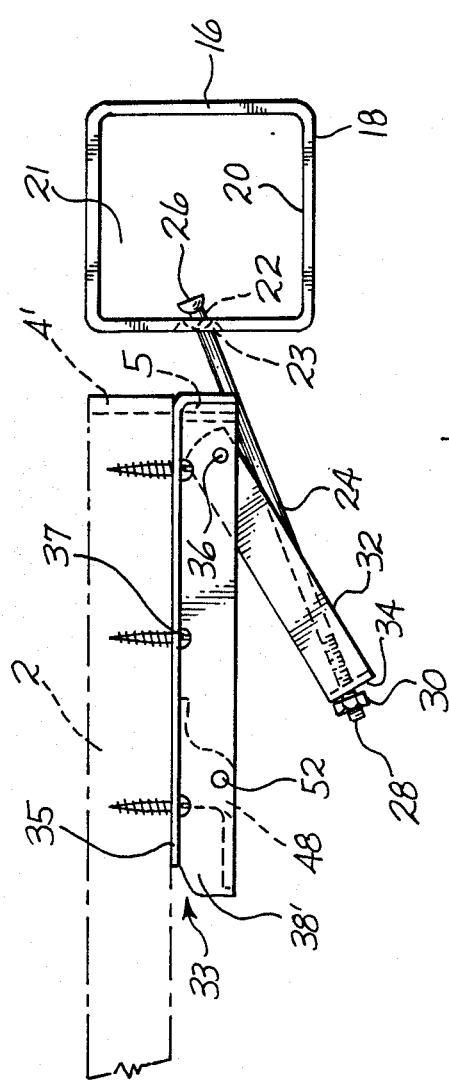
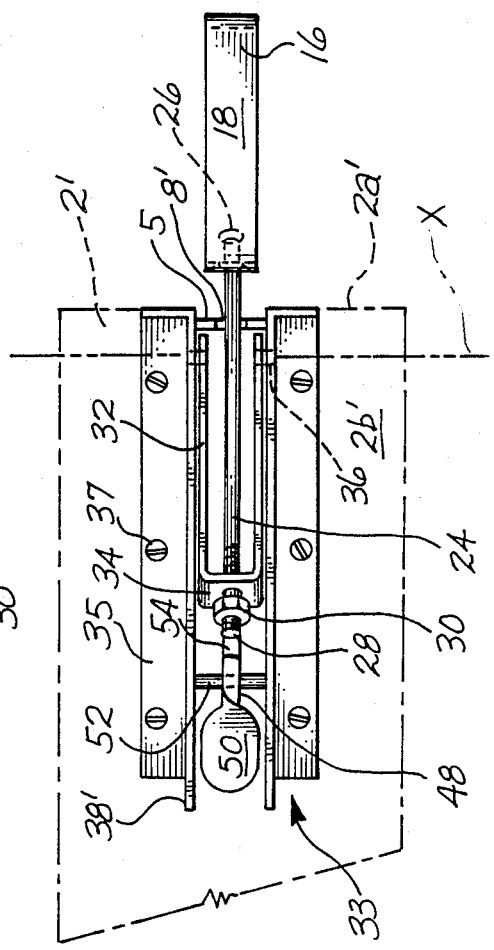
Fig. 7
Fig. 8

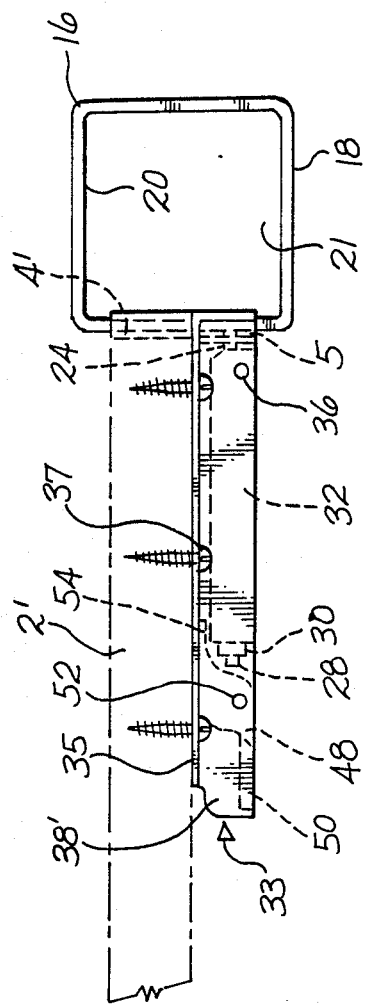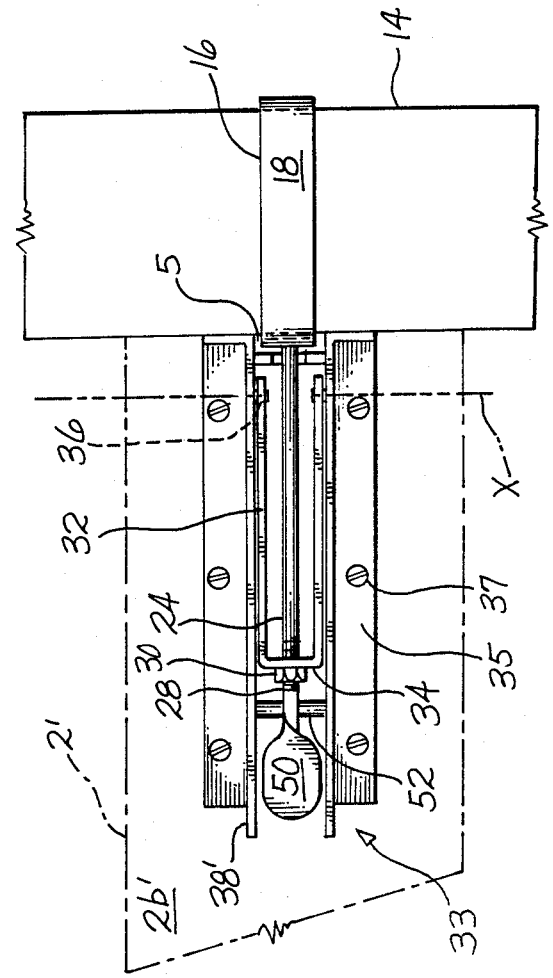

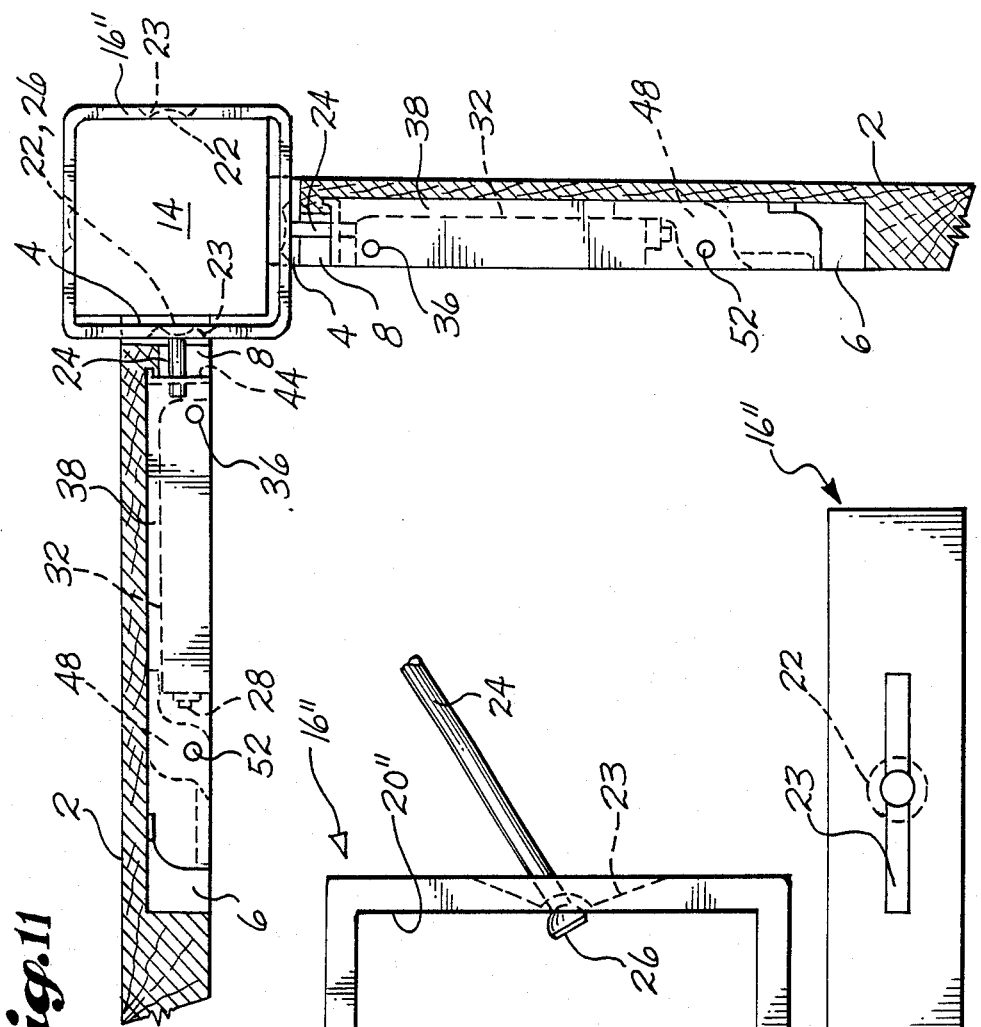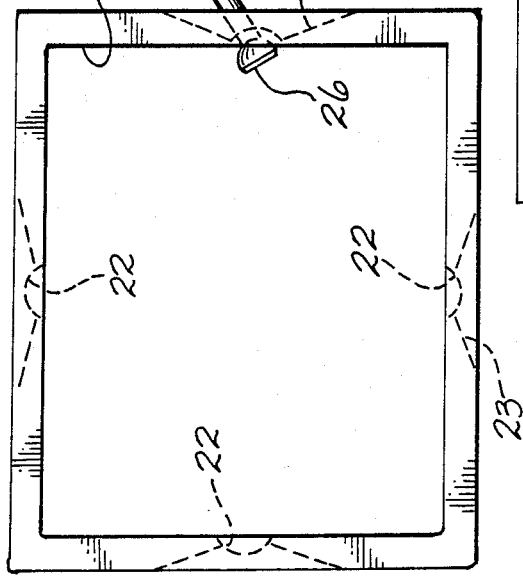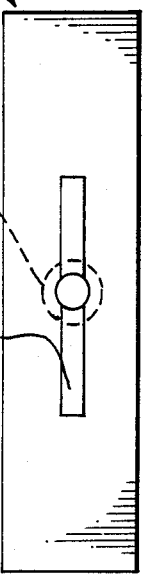

JOINT FOR RELEASABLY SECURING SUPPORT MEMBER IN MODULAR STRUCTURE

TECHNICAL FIELD

This invention relates to joints for use in furniture and the like and, more particularly, to such a joint in which a first member extends through a ring that is pulled by a lever-actuated shaft to pull the first member against a second member and this is received into a recess in the second member and does not contact any portion of the second member to ensure proper contact between the first and second members above and below the recess.

BACKGROUND ART

There are many situations in which it is desirable for furniture, grandstands, and the like to be easily assemblable and disassemblable for moving or storage. Various types of detachable joints have been proposed for use in collapsible furniture. These known joints tend to have a number of problems associated with them. Many of such joints are overly complex and expensive and lack versatility in the types of structures in which they can be used. Known detachable joint arrangements also tend to be relatively difficult and time consuming to assemble and disassemble. Another common problem is that the part of the joint tend to wear when the joint is assembled and disassembled, thus leading to a loosening of the joint and an overall decrease in the strength of the piece of furniture. Known detachable furniture joints also generally do not have any means of compensating for irregularities in the parts of the furniture being joined, such as irregularities on the outer surface of a vertical support member or the horizontal member to which the vertical support member is to be joined. Such irregularities can cause wobbliness in the joint and, thus, adversely affect the strength of the piece of furniture.

Joints which are apparently detachable and in which one end of a shaft engages a leg and the other end of the shaft extends through a corner brace are disclosed in U.S. Pat. No. 310,133, granted Dec. 30, 1884, to R. C. Haase; U.S. Pat. No. 2,386,201, granted Oct. 9, 1945, to J. A. Ferguson; U.S. Pat. No. 3,327,658, granted June 27, 1967, to K. D. Schreyer; and U.S. Pat. No. 3,572,787, granted Mar. 30, 1971, to G. L. Timmerman et al. In each of the joints disclosed in these four patents, the end of the shaft which extends through the corner brace is threaded and is engaged by a nut that is turned to pull the leg against side rails. U.S. Pat. No. 326,582, granted Sept. 22, 1885, to W. A. Osborn et al., discloses a joint in which opposite ends of a clamp are received into grooves in a table leg, end portions of two side rails are received into additional grooves in the leg, and a hook extending from the clamp extends through a corner brace and is engaged by a curved rotating wedge. U.S. Pat. No. 3,167,292, granted Jan. 26, 1965, to N. L. Meyerowitz, discloses a circular bracket for supporting a table top on a pole. The pole extends through the bracket and the table top and is secured in position by a flap inside the bracket which is urged against the pole by means of a thumb screw.

U.S. Pat. No. 509,618, granted Nov. 28, 1893, to G. C. Goodyear, discloses a fastening for a furniture leg. In the Goodyear arrangement, the ends of two side rails are received into grooves in the leg and a "clip" extends around the outer portion of the leg and through openings in the side rails. The two inner ends of the clip extend through a tie which forms a corner brace. The inner ends are threaded, and the clip is tightened around the leg by two nuts which engage the inner ends.

U.S. Pat. No. 3,280,767, granted Oct. 25, 1966, to B. Kahn, discloses knock-down metal shelving. In the shelving arrangement, each of the four corner posts is attached to each shelf by a joint which includes a metal ring that surrounds the post. A set screw extends through a corner piece and through the ring to bear against the post. A nut is turned to pull the ring into contact with the vertical flanges of the shelf to tighten the joint.

A shelf and corner post assembly is disclosed in U.S. Pat. No. 3,964,404, granted June 22, 1976, to F. F. Mueller et al. Further embodiments of the assembly are disclosed in U.S. Pat. No. 4,132,178, granted Jan. 2, 1979, to the same inventors. In the assembly, each corner post is urged against the inside surface of the perimeter of the shelf frame. A diagonal corner brace is secured to the frame. A U-shaped clip has upper and lower arms that straddle and abut the upper and lower surfaces of the brace. A screw is received through an opening in the U-shaped clip and threadedly engages the brace to urge the clip against the post and the post against the inner perimeter surface of the frame. In an alternative embodiment shown in FIGS. 9-11 of the later patent, the U-shaped clip is replaced by a cam locking lever carried by the diagonal brace.

U.S. Pat. No. 4,237,798, granted Dec. 9, 1980, to J. H. Welsch et al., discloses adjustable metal shelving. In the shelving, each of the four corner posts is attached to each shelf by means of a clamp. Each corner of the shelf is truncated and has a diagonal vertical surface. A brace member fits over the diagonal surface and is secured thereto by screws. The brace member forms a pocket with upper and lower walls which have arcuate seats that correspond in shape to the circumferential shape of the post. The U-shaped clamp member extends around the post with its opposite arms being received into the pocket formed by the brace member. The screws which connect the brace member to the truncated surface of the shelf also extend into the clamp member to pull the clamp member into engagement with the post and secure the post between the clamp and the arcuate seats formed by the brace member. The height and width of the clamp is approximately the same as the height and width of the pocket of the brace member to provide a substantially tight fit between the clamp and the pocket.

The above patents and the prior art that is cited therein should be studied for the purpose of putting the present invention into proper perspective relative to the prior art.

DISCLOSURE OF THE INVENTION

The subject of this invention is a joint for securing a generally vertical member to a generally horizontal portion of a structure. The joint may be used in modular structures, such as furniture, grandstands, and the like having a generally horizontal portion. According to an aspect of the invention, the joint comprises a ring that defines a generally vertical opening shaped and dimensioned to slidably receive the vertical member therethrough. An elongated member extends generally horizontally from the ring and through an opening in the horizontal portion. The elongated member has a first end attached to the ring, and a second opposite end. Vertical surface portions of the horizontal portion have a recess formed therein for receiving a part of the ring.

The recess is defined by an inner generally vertical surface, a top surface, and a bottom surface. Releasable fastening means engages the second end of the elongated member and pulls it to pull said part of the ring into the recess and urge the vertical member into contact with said vertical surface portions above and below the recess. The fastening means is adjustable for adjusting the tension in the elongated member and the tightness of the joint. The recess and the ring are dimensioned so that, when said part of the ring is received into the recess and the vertical member is urged against said vertical surface portions by the fastening means, the ring is spaced from the inner vertical surface, top surface, and bottom surface of the recess.

The joint of the invention has a number of advantages. It is relatively simple in structure and inexpensive to manufacture. The joint makes it possible to quickly and easily assemble and disassemble furniture or other structures. The joint is also very versatile and may be used in various types of furniture and other structures. The configuration of a structure into which joints of the invention are incorporated may be quickly and easily changed by adjusting the height of horizontal portions along vertical members and/or by adding or removing horizontal portions and vertical members. One of the most important advantages of the joint of the invention is that the contact between the vertical member and the horizontal portion above and below the recess and the spacing of the ring from the surfaces of the recess gives the ring a free-floating action which automatically compensates for wearing of the parts or irregularities in the vertical member and/or horizontal portion. The automatic adjustment prevents wobbling of the vertical member relative to the horizontal portion and ensures that the joint is always tight and secure.

The fastening means may take a variety of forms. Preferably, the fastening means comprises an over-center latch. Such a latch provides a secure connection and helps prevent inadvertent disengagement or loosening of the joint. In addition, such latches are generally very durable and easily operated.

A preferred feature of the joint is the pivotable attachment of the first end of the elongated member to the ring. This enhances the free-floating action of the ring and cooperates with the spacing of the ring from the recess walls to ensure proper firm contact between the vertical member and the horizontal portion.

In a first preferred embodiment of the joint, the horizontal portion comprises a horizontal member having a vertical end surface, a vertical side surface generally perpendicular to the end surface, and a cavity opening onto the side surface. The fastening means is positioned in the cavity. The recess is formed in the end surface. The opening through which the elongated member extends opens onto the inner generally vertical surface of the recess and communicates the recess and the cavity. In this embodiment of the invention, the positioning of the fastening means in the cavity minimizes its impact on the appearance of the piece of furniture to maintain the attractiveness of the piece of furniture and also helps prevent contact between the fastening means and persons or other objects.

In a second preferred embodiment of the invention, the horizontal portion comprises a horizontal member having a vertical end surface and a vertical side surface generally perpendicular to the end surface, and a fastener housing secured to the side surface. The recess is formed in the end surface and the housing. The opening through which the elongated member extends opens onto a portion of the inner generally vertical surface of the recess formed by the housing. This embodiment of the joint has the advantage of being readily usable with any horizontal portion of a structure with only minimal modification of such horizontal portion.

These and other advantages and features of the invention will become apparent from the detailed description of the best modes for carrying out the invention that follows.

BRIEF DESCRIPTION OF THE DRAWINGS

In the drawings, like element designations refer to like parts throughout, and:

FIG. 1 is a pictorial view of the first preferred embodiment of the invention.

FIG. 2 is a top plan view of the embodiment shown in FIG. 1, illustrating the latch mechanism in an open position.

FIG. 3 is a side elevational view of the embodiment shown in FIG. 2.

FIGS. 4 and 5 are like FIGS. 2 and 3, respectively, except that the latch mechanism is shown in a closed position.

FIGS. 6–10 are like FIGS. 1–5 except that the second preferred embodiment of the invention is shown.

FIG. 11 is a top plan view of the first preferred embodiment being used in a corner joint.

FIG. 12 is a top plan view of the ring shown in FIG. 11.

FIG. 13 is a side view of the ring shown in FIGS. 11 and 12.

BEST MODES FOR CARRYING OUT THE INVENTION

The drawings show two embodiments of a joint that are constructed in accordance with the invention and that constitute the est modes for carrying out the invention currently known to the applicant. The first preferred embodiment is shown in FIGS. 1–5. The second preferred embodiment is shown in FIGS. 6–10. A modified form of the first preferred embodiment with a modified ring for forming a corner joint is shown in FIGS. 11–13.

The joint shown in FIGS. 1–5 releasably secures a leg 14 to a side rail 2. The leg 14 and the side rail 2 are parts of a piece of furniture, a grandstand, or a like structure. The joint includes a metal ring 16 through which the leg 14 extends and an over-center latch carried by the rail 2. The latch pulls the ring 16 and leg 14 toward the rail 2 to secure the leg 14. The rail 2 is provided with a recess 4 for receiving the ring 16 so that the leg 14 is pulled securely against the rail 2 but the ring 16 does not touch any portion of the rail 2.

The ring 16 has an inner surface 20 which defines a vertical opening 21 that extends through the ring 16 for receiving the leg 41 therethrough. The opening 21 is shaped and dimensioned to slidably receive the leg 14 with a small amount of clearance. As shown in the drawings, the opening 21 and the leg 14 each have a generally square cross section. Other cross-sectional configurations, for example round or triangular configurations, may also be provided. The ring 16 has an outer surface 18 from which an elongated member of the fastening means extends generally horizontally. In the preferred embodiments shown in the drawings, the elongated member is a shaft 24. Other types of elongated members may also be used, such as a flexible cable. As shown in the drawings, the shaft 24 is engaged by the over-center latch to secure the leg 14.

The shaft 24 may be attached to the ring 16 in a variety of ways. In the preferred embodiments shown in the drawings, the outer end of the shaft 24 extends through an opening 22 in the sidewall of the ring 16 and terminates in a generally semispherical head 26. The shaft 24 is secured to the ring 16 by the engagement of the head 26 against the sidewalls of the socket-shaped opening 22. A horizontal slot 23, which intersects the socket opening 22, is provided to allow pivoting of the shaft 24 when the latch is opened or closed. As can be seen in FIGS. 11 and 12, the ends of the slot 23 taper inwardly from the outer surface 18 to the inner surface 20 of the ring 16.

The rail 2 has a vertical end surface 2a and a vertical side surface 2b which is perpendicular to the end surface 2a. The recess 4 is formed in the end surface 2a. A cavity 6 opens onto the side surface 2b and receives the latch mechanism. The recess 4 has a rectangular configuration with an inner vertical surface 4a, a top horizontal surface 4b, and a bottom horizontal surface 4c. An opening or slot 8 opens onto the inner surface 4a of the recess 4 and extends horizontally inwardly to communicate the recess 4 and the cavity 6. The shaft 24 extends from the ring 16 through the slot 8.

The latch mechanism includes a generally U-shaped mounting yoke 38 which fits into the cavity 6. The yoke 38 has two rear tabs 40 and a forward tab 42 which are received into two rear slots 10 and a forward slot 12, respectively, formed in the sidewalls of the main portion of the cavity 6. The engagement of the tabs 40, 42 in the slots 10, 12 secures the yoke 38 in position in the cavity 6. The forward end of the yoke 38 has a horizontal slot 44 formed therein. The slot 44 is aligned with the slot 8 in the rail 2 for receiving the shaft 24 and allowing pivoting of the shaft 24.

The latch mechanism also includes a U-shaped lever 32. The outer ends of the opposite arms of the lever 32 are secured to the arms of the yoke 38 by means of pivot pins 36. The pivot pins 36 are vertically spaced from each other, and the forward end of the lever 32 is open, to allow pivoting of the shaft 24. The rear inner end 34 of the lever 32 has an opening extending therethrough for receiving the threaded end 28 of the shaft 24. A nut 30 threadedly engages the end 28 to prevent the shaft 24 from becoming detached from the lever 32. The tension in the shaft 24 and the tightness of the joint may easily be adjusted by turning the nut 30.

FIGS. 2 and 3 show the lever 32 in its open position, and FIGS. 4 and 5 show the lever in its closed position. The pivot pins 36 are positioned to locate the pivot axis X of the lever 32 off center so that the shaft 24 must cross the axis X when it is pivoted between its open and closed positions. This over-center latch arrangement provides a secure connection between the leg 14 and the rail 2 by preventing inadvertent pivoting of the lever 32 toward its open position shown in FIGS. 2 and 3.

In the operation of the latch mechanism, the lever 32 is simply pushed from the open position shown in FIGS. 2 and 3 to the closed position shown in FIGS. 4 and 5 to secure the leg 14 against the rail 2. The engagement of the threaded end 28 of the shaft 24 by the inner end of the lever 32 pulls the shaft 24, the attached ring 16, and the leg 14 toward the rail 2 when the lever 32 is moved inwardly. The ring 16 is pulled into the recess 4, and the leg surfaces above and below the ring 16 are pulled against the vertical end surface 2a of the rail 2 above and below the recess 4 to urge the leg 14 against the end surface 2a of the rail 2.

As can be seen in FIGS. 4 and 5, the recess 4 is dimensioned to receive a part of the ring 16 when the leg 14 is urged against the end surface 2a of the rail 2. The sidewall of the ring 16 is received into the recess 4 without contact between the ring 16 and any portion of the rail 2. The ring 16 is spaced from each of the surfaces which define the recess 4, i.e., the inner surface 4a, the top surface 4b, and the bottom surface 4c. The spacing of the ring 16 from the recess walls allows the ring 16 to have a floating action so that the leg 14 will be securely urged against the rail 2 both above and below the recess 4. For example, if there irregularities in the end surface 2a of the rail 2 and/or the surface of the leg 14 facing the end surface 2a, the ring 16 is free to move in the recess 4 to allow the position of the leg 14 to automatically adjust to compensate for the irregularities. The pivotal engagement of the head 26 of the shaft 24 in its socket 22 facilitates the automatic adjustment and helps provide the desired firm abutment between the leg 14 and rail 2. The base of the socket 22 and the height of the slot 23 are dimensioned to allow pivoting of the head 26 in all directions. The abutment above and below the recess 4 between the leg 14 and the rail 2 and the abutment between the ring 16 and the opposite surface of the leg 14 forms a triangular pattern of forces on the leg to make the joint very secure and free from wobbling. This pattern is illustrated by the arrows shown in FIG. 5. The ring 16 is made from a strong rigid material so that it will maintain its shape to maintain the desired force pattern.

The latch mechanism is preferably provided with a trigger 48 for releasing the latch mechanism. The trigger 48 is mounted to the yoke 38 by means of a pivot pin 52. The trigger 48 has a finger tab 50 which is simply pushed inwardly to pivot the trigger 48. When the trigger 48 is pivoted, a finger 54 on the trigger 48 opposite the finger tab 50 engages the lever 32 and pivots the lever 32 outwardly. The trigger 48 may then be reset by hand or may be left in its open position to be pivoted back into its flush position shown in FIGS. 4 and 5 by subsequent inward pivoting of the lever 32.

The second preferred embodiment of the joint of the invention is shown in FIGS. 6–10. In FIGS. 6–10, the parts of the joint which are the same as the parts in the first embodiment shown in FIGS. 1–5 are designated by the same reference numerals as in FIGS. 1–5. Parts which are different in the second embodiment but are equivalent are indicated by the same reference numeral with a prime symbol.

The rail 2' shown in FIGS. 6–10 has a vertical end surface 2a' and a vertical side surface 2b'. A recess 4' is formed in the end surface 2a'. In this embodiment, rather than being mounted in a cavity in the rail, the latch mechanism of the fastening means is mounted on the side surface 2b' of the rail 2'. The fastening means includes a housing 33 which has two opposite outwardly extending mounting flanges 35. Suitable fasteners 37 are received through holes in the flanges 35 to secure the housing 33 to the rail 2'. Projecting outwardly from the mounting flanges 35 is a yoke portion 38' which is similar to the yoke 38 of the first embodiment shown in FIGS. 1–5. The ring 16, shaft 24, lever 32, and trigger 48 of the second embodiment are the same as in the first embodiment, and the lever 32 and trigger 48 are pivotally mounted to the yoke portion 38' in the same manner that the lever 32 and trigger 48 are mounted to the yoke 38 in the first embodiment.

Because of the non-flush mounting of the latch mechanism in the second embodiment, the recess for receiving a part of the ring 16 includes, in addition to the recess portion 4' formed in the end surface 2a' of the rail 2', a recess portion 5 formed in the end of the fastener housing 33. The recess 5 is formed in the end of the yoke portion 38'. Thus, in this embodiment the horizontal rail 2' is in effect extended by the fastener housing 33, and the recess 4' in the rail 2' and the recess 5 in the housing 33 together form a recess 4', 5 in the extended horizontal portion 2', 33 of the piece of furniture or other structure. The end of the yoke portion 38' of the housing 33 has a slot 8' through which the shaft 24 extends and which opens onto the housing portion 5 of the recess 4', 4.

FIGS. 11–13 show a modified form of the first preferred embodiment of the joint shown in FIGS. 1–5 which provides a corner connection between a leg 14 and two rails 2. In this embodiment, the ring 16" has a modified construction with four circumferentially spaced openings 22 and slots 23 for attaching side rails to any one or more of the four sides of the leg 14. The ring 16" is dimensioned to ensure sufficient clearance between the leg 14 and the inner surface 20" of the ring 16" to allow securing of the latches by pivoting the levers 32. The connection between the leg 14 and each of the two rails 2 shown in FIG. 11 is the same as that described above in connection with the embodiment shown in FIGS. 1–5. A corner joint may also be formed using the embodiment shown in FIGS. 6–10 or a combination of the embodiments shown in FIGS. 1–5 and 6–10. In addition, a joint may be formed in which two side rails are attached to opposite sides of a leg. This type of connection has a modified force pattern in which the leg is held in position by the two side rails.

It is anticipated that joints constructed according to the invention will be used primarily in the construction of modular furniture. Joints constructed according to the invention are particularly useful in modular construction because of their ease of assembly and disassembly and their great versatility. It is a simple matter to change one side rail or support member for another or to slide a side rail along its support member in an upward or downward direction to adjust the size and configuration of the piece of furniture into which the joint is incorporated. In order to facilitate and maximize the versatility of joints constructed according to the invention, it is preferable to provide the ring 16" with a plurality of sockets 22, as shown in FIGS. 11–13.

Throughout the description of the preferred embodiments of the invention, the terms "horizontal", "vertical" and the like have been used to refer to the orientation of the support member and the structures attached thereto. The use of such terms is for purposes of illustration and is intended to indicate the usual orientation of such elements. It is of course intended to be understood that the use attitude that is illustrated and described herein may be varied without departing from the spirit and scope of the present invention.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the invention as defined by the following claims.

What is claimed is:

1. For use in modular structures, such as furniture, grandstands, and the like, having a generally horizontal portion, a joint for securing a generally vertical member to said horizontal portion, said joint comprising:

a ring that defines a generally vertical opening shaped and dimensioned to slidably receive said vertical member therethrough;

an elongated member extending generally horizontally from the ring and through an opening in said horizontal portion; said elongated member having a first end attached to the ring, and a second opposite end;

vertical surface portions of said horizontal portion having a recess formed therein for receiving a part of the ring; said recess being defined by an inner generally vertical surface, a top surface, and a bottom surface; and releasable fastening means for engaging said second end of the elongated member and pulling the elongated member to pull said part of the ring into the recess and urge said vertical member into contact with said vertical surface portions above and below the recess, said fastening means being adjustable for adjusting the tension in the elongated member and the tightness of the joint;

said recess and said ring being dimensioned so that, when said part of the ring is received into the recess and said vertical member is urged against said vertical surface portions by the fastening means, the ring is spaced from the inner vertical surface, the top surface, and the bottom surface of the recess, to give the ring a free-floating action in the recess to automatically compensate for wearing and irregularities in said vertical member and said horizontal portion to thereby prevent wobbling of said vertical member.

2. A joint as described in claim 1, in which said horizontal portion comprises a horizontal member having a vertical end surface, a vertical side surface generally perpendicular to said end surface, and a cavity opening onto said side surface; the fastening means is positioned in said cavity; the recess is formed in said end surface; and the opening through which the elongated member extends opens onto said inner generally vertical surface of the recess and communicates the recess and said cavity.

3. A joint as described in claim 2, in which the fastening means comprises an over-center latch.

4. A joint as described in claim 2, in which said first end of the elongated member is pivotably attached to the ring.

5. A joint as described in claim 1, in which said horizontal portion comprises a horizontal member having a vertical end surface and a outer vertical side surface generally perpendicular to said end surface, and a fastener housing secured to said outer side surface; the recess is formed in said end surface and said housing; and the opening through which the elongated member extends opens onto a portion of said inner generally vertical surface of the recess formed by said housing.

6. A joint as described in claim 5, in which the fastening means comprises an over-center latch.

7. A joint as described in claim 5, in which said first end of the elongated member is pivotably attached to the ring.

8. A joint as described in claim 1, in which the fastening means comprises an over-center latch.

9. A joint as described in claim 8, in which said first end of the elongated member is pivotably attached to the ring.

10. A joint as described in claim 1, in which said first end of the elongated member is pivotably attached to the ring.

* * * * *